US012728756B2

(12) United States Patent
Bhannur et al.

(10) Patent No.: US 12,728,756 B2
(45) Date of Patent: Sep. 8, 2026

(54) SYSTEMS AND METHODS FOR IDENTIFYING AND MERGING DUPLICATE CHARGE STATION LOCATIONS

(71) Applicant: Ford Global Technologies, LLC, Dearborn, MI (US)

(72) Inventors: Mahesh Bhannur, Canton, MI (US); Micah J Kaiser, Clinton Township, MI (US); Nitin Singh, Dearborn, MI (US); Jagannat Chengavalli Lakshminarayanan, Dearborn, MI (US); Divya Siva Madhuri Malineni, Dearborn, MI (US); Gayatri Mehta, Dearborn, MI (US); Mark Poll, Plymouth, MI (US)

( * ) Notice: Subject to any disclaimer, the term of this patent is extended or adjusted under 35 U.S.C. 154(b) by 897 days.

(21) Appl. No.: 18/160,141

(22) Filed: Jan. 26, 2023

(65) Prior Publication Data

US 2024/0253510 A1 Aug. 1, 2024

(51) Int. Cl.
*B60L 53/66* (2019.01)
*B60L 53/67* (2019.01)
*B60L 58/18* (2019.01)

(52) U.S. Cl.
CPC ............... *B60L 53/66* (2019.02); *B60L 53/67* (2019.02); *B60L 58/18* (2019.02)

(58) Field of Classification Search
CPC ........... B60L 53/66; B60L 53/67; B60L 58/18
See application file for complete search history.

(56) References Cited

U.S. PATENT DOCUMENTS 8,564,403 B2 * 10/2013 Landau-Holdsworth .................... B60L 53/64 340/5.2
8,577,528 B2 11/2013 Uyeki
(Continued)

FOREIGN PATENT DOCUMENTS

CN 110322120 A 10/2019

OTHER PUBLICATIONS

Charge Management Software for Charging Stations: EV Charging Suite, Aug. 10, 2020, 1-2.

(Continued)

*Primary Examiner* — Richard V Muralidar
(74) *Attorney, Agent, or Firm* — Emily Campbell; Eversheds Sutherland (US) LLP

(57) ABSTRACT

The disclosure is generally directed to a method and system for charge station management including collecting data related to a plurality of charge stations, the data identifying location data, an operator, and a data provider for each of the plurality of charge stations; collating the data to match the location data with the operators of each of the plurality of charge stations; and sequentially merging the location data based on a set of criteria including the data from each of the data providers within a predetermined configurable radius defining a perimeter surrounding each data provider-identified location. Collecting raw data includes receiving the raw data from crowd-sourced data providers; receiving the raw data from the operators of the plurality of charge stations; and organizing the raw data as batch data. Sequentially merging includes setting the predetermined configurable radius about a data provider as a pivot point for a predetermined circumference; and merging location data within the predetermined circumference to remove redundant locations (Continued)

based on the set of criteria, including criteria identifying a same operator within the predetermined circumference.

20 Claims, 7 Drawing Sheets

(56) References Cited

U.S. PATENT DOCUMENTS

| | | | | |
|---|---|---|---|---|
| 9,851,213 | B2 | 12/2017 | Oh et al. | |
| 10,809,085 | B2 | 10/2020 | North et al. | |
| 12,392,631 | B2 * | 8/2025 | Bhannur | G01C 21/3679 |
| 2018/0281612 | A1 * | 10/2018 | Perry | H04W 4/80 |
| 2024/0142256 | A1 * | 5/2024 | Feldman | G01C 21/3679 |

OTHER PUBLICATIONS

Driivz, Self-Service Tools, Driver Self-Service Tools, Solutions Platform Company Case Studies, News & Buzz, 1-5.

* cited by examiner

SYSTEMS AND METHODS FOR IDENTIFYING AND MERGING DUPLICATE CHARGE STATION LOCATIONS

FIELD OF THE DISCLOSURE

This disclosure generally relates to vehicles, and more particularly relates to systems and methods for locating and merging charging station location data that meet defined criteria.

BACKGROUND

Electric vehicles require frequent charging. Many drivers who prefer to fast charge or are on a trip some distance from home need to locate a charging station within a defined distance from their vehicle. For example, if a vehicle only has a limited amount of charge, it is frequently necessary to locate a charging station that is within a predefined area close to the electric vehicle. When locating a charge station, there are applications available to drivers to help locate charging stations. Some applications use crowd-sourced data collected from other drivers, some applications are supported by charge station operators. Unfortunately, many charge station location applications are either conflicting with other applications or do not take into account redundancies in the data provided. As such, locating a charging station may be difficult.

It is desirable to provide solutions that address redundancies in typical charge station location applications.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
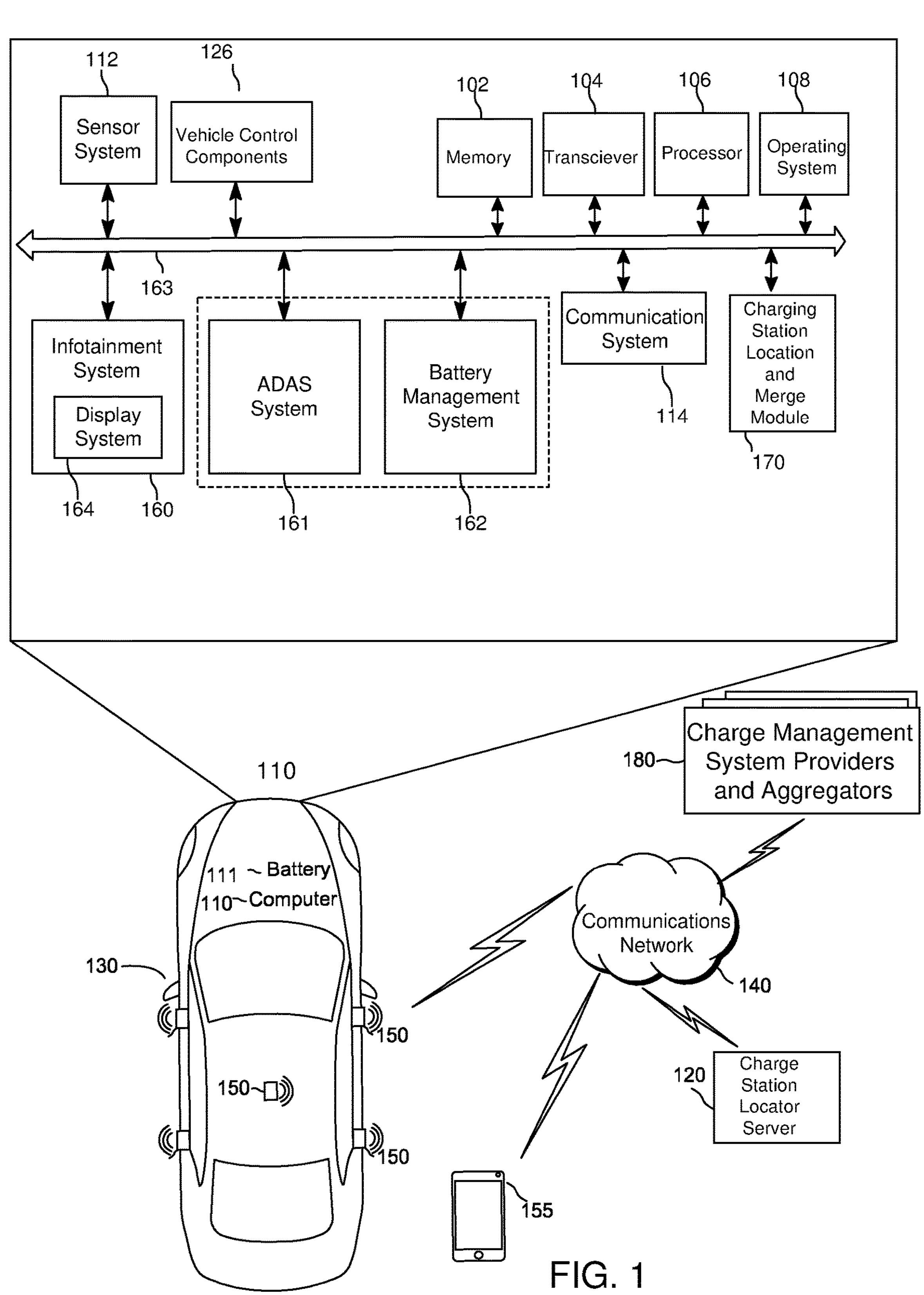
FIG. 1 illustrates an example system that includes an electric vehicle in accordance with one or more embodiments of the disclosure.

In terms of a general overview, this disclosure is generally directed to systems and methods for identifying and merging duplicate charge station locations.

In one or more embodiments, a method for electric vehicle charge station management includes collecting data related to a plurality of charge stations, the data including location data for the plurality of charge stations, operators of the plurality of charge stations, and charge station data providers for the plurality of charge stations, collating the data to match the location data with the operators of each of the plurality of charge stations, merging the location data for the plurality of charge stations within the predetermined geohash by merging the location data for the first operator with location data within an area closer to the first operator than the second operator, and merging the location data for the second operator with location data within an area closer to the second operator than the first operator, and sending the reduced set of charging locations to a user device or vehicle.

In one or more embodiments, collecting data related to the plurality of charge stations includes receiving the data from crowd-sourced data providers, and receiving the data from the operators of the plurality of charge stations, and receiving the data as periodic batch data from charge station data providers on a daily basis.

Other embodiments are directed to a system and an electric vehicle with a vehicle computer configured a memory that stores computer-executable instructions; a transceiver coupled to memory, the transceiver configured to receive raw data related to a plurality of charge stations, the raw data identifying location data of the plurality of charge stations, operators of each of the plurality of charge stations, and data providers for each of the plurality of charge stations; a processor configured to access the memory and execute the computer-executable instructions to collate the data to match the location data with the operators of each of the plurality of charge stations, merge the location data for the plurality of charge stations within the predetermined geohash by merging the location data for the first operator with location data within an area closer to the first operator than the second operator, and merging the location data for the second operator with location data within an area closer to the second operator than the first operator, and send the reduced set of charging locations to a user device or vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

FIG. 1 illustrates an example electric vehicle system 100. Vehicle 130 represents an electric vehicle requiring periodic charging. The system 100 may be implemented in a variety of ways and can include various types of devices. For example, the example system 100 can include some components that are a part of the vehicle 130, and, in some embodiments, other components that are accessible via a communications network 140. The components that can be a part of the vehicle 130 can include a vehicle computer 110, shown in exploded form.

FIG. 1 illustrates vehicle computer 110 in exploded form and may perform various functions such as controlling engine operations (fuel injection, speed control, emissions control, braking, etc.), managing climate controls (air conditioning, heating etc.), activating airbags, and issuing notifications (check engine light, bulb failure, low tire pressure, vehicle in a blind spot, etc.). Vehicle computer 110 includes example components that may be included in vehicle 130 including memory 102, which is one example of a non-transitory computer-readable medium, transceiver 104 to enable communications, processor 106, operating system 108, shown coupled to a bus 163. Further components include a sensor system 112, including both internal and external cameras 150, communication system 114, which may be a wireless communication system such as a Ford intranet system, vehicle control components 126, location services module 130 including GPS location services, infotainment system 160 with display system 164 which may have a GUI used for carrying out various operations including, for example, by a driver to input a level of responsiveness for Driver Assistance System (ADAS) 161 to perform an operation. A further example component may include a battery management system 162 which may provide information to a driver to indicate when electric vehicle 130 requires a charge. The various components are communicatively coupled to each other via one or more buses such as an example bus 163, which may be implemented using various wired and/or wireless technologies. For example, bus 163 can be a vehicle bus that uses a controller area network (CAN) bus protocol, a Media Oriented Systems Transport (MOST) bus protocol, and/or a CAN flexible data (CAN-FD) bus protocol, or an automotive ethernet system in accordance with IEEE 802.3 and 802.1 specifications using a wired network to connect components with vehicle 130.

Some or all portions of the bus 163 may also be implemented using wireless technologies such as Bluetooth®, Bluetooth® Ultra-Wideband, Wi-Fi, Zigbee®, or near-field-communications (NFC).

Sensor system 112 can include various types of sensors such as, for example, a weight sensor, and an external and internal camera such as sensors 150 capable of facial detection, a radar detector, a front-facing camera, and others on vehicle 130. Vehicle control components 126 can include various components and systems associated with driving functions of electric vehicle 130 and its various other functions (such as, for example, stocks and struts whose characteristics can be controlled for varying a performance of vehicle 130). The various components may be controlled, activated, and/or operated by the vehicle computer 110 and ADAS 161.

In one implementation, vehicle 110 includes a charging station location and merge module 170 relying on cloud-based application data or implemented as a part of vehicle computer 110. In another implementation, charge station location and merge module 170 receives data from charge station locator 120 accessible through network 140.

Memory 102 which is one example of a non-transitory computer-readable medium, may be used to store the OS 108, and various software modules utilized by or to implement features such as charging station and location merge module 170 which is one or more modules in the form of computer-executable instructions executed by processor 106 for performing various operations in accordance with the disclosure. More particularly, charging station and location merge module 170 may be executed by processor 106 to provide charging stations within an area when electric vehicle 130 requires a charge.

Vehicle computer 110, in one or more embodiments, may execute certain operations associated with facial recognition to allow entry and operation of vehicle systems such as the ADAS system 161 in accordance with the disclosure.

The wireless communication system 114 may include a set of wireless communication nodes and/or sensors 150 mounted upon vehicle 130 and within vehicle 130 in a manner that allows the vehicle computer 110 to communicate with a cloud network 120 accessible through a network connection 140. Examples of wireless communication nodes 150 may include sensors and/or emitters capable of detecting objects and distances and may include ultrasonic radar, LiDAR, cameras, and the like. In one or more embodiments, wireless communication node data may be enhanced or substituted with cloud-based network data communicated to vehicle 130.

The vehicle computer 110 may connect to charge station locator server 120 via communications network 140. The communications network 140 may include any one network, or a combination of networks, such as a local area network (LAN), a wide area network (WAN), a telephone network, a cellular network, a cable network, a wireless network, and/or private/public networks such as the Internet. For example, the communications network 140 may support communication technologies such as TCP/IP, Bluetooth®, Bluetooth Low Energy (BLE), cellular, near-field communication (NFC), Wi-Fi, Wi-Fi direct, Li-Fi, acoustic or ultrasonic audio communication, Ultra-Wideband (UWB), machine-to-machine communication, and/or human-to-machine communication. Battery management system module 162 may be executed by processor 106 for performing various operations in accordance with the disclosure. For example, battery management system 162 may operate to inform a user that battery 111 requires a charge. Memory 102 may be used to store information that can be accessed and used by processor 106 when executing the charging station location and merge module 170. As another example, the battery management system 162 may manage the charge, discharge, and general operation of the battery to maximize its efficiency. This may include predicting charge times based on current charge as well as other considerations such as ambient temperature, historical charging data, charger capability (rating, such as amps per minute), etc. The battery management system may also be connected to ta CAN bus system 163 or as part of an automotive ethernet.

Vehicle on board computer 110 may include a display, such as a touchscreen having softkeys (graphical icons), and a biometric component (to enable facial recognition, a fingerprint scanner, or a microphone for voice command input). Operating system 108 can be any of various kinds of software used, for example, as an iOS® operating system, an Android® operating system, or a Windows® operating system.

Figure 2:
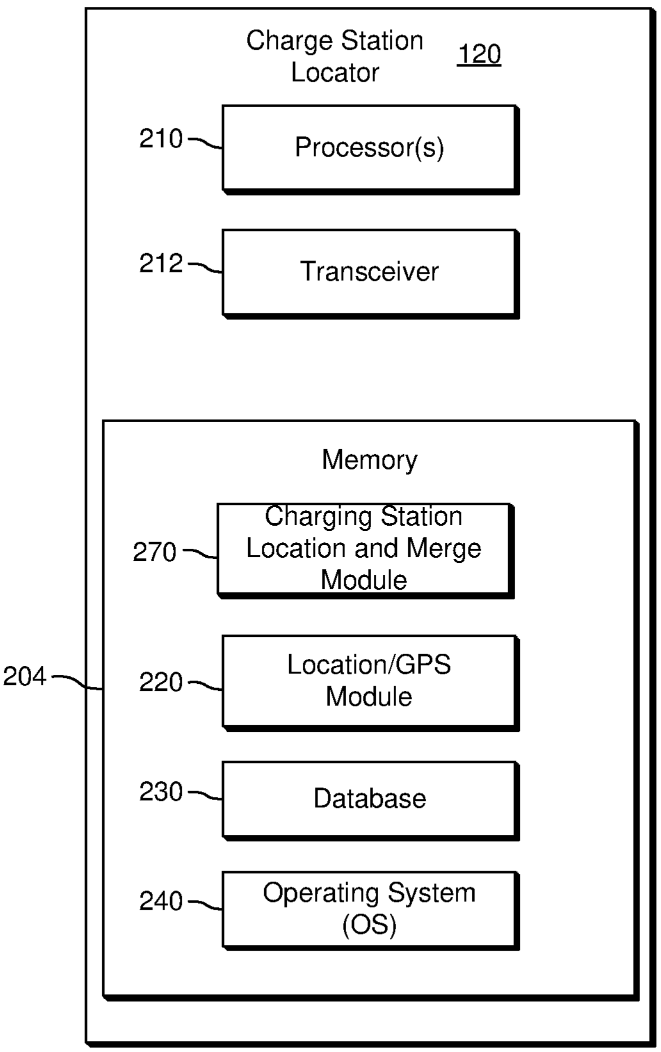
FIG. 2 illustrates some example functional blocks that may be included in a cloud server system appropriate for providing charge station location data without redundancies in accordance with embodiments of the disclosure.

In one or more embodiments, communications network 140 may be coupled to a charge station locator server 120, shown in more detail in FIG. 2, or a user device 155, which may include a mobile device, desktop, or other interactive user device in accordance with this disclosure. Communications network 140 is further shown coupled to charge management system providers and aggregators 180 which may provide raw data via communications network 140 to charge station locator 120 and/or to vehicle 130.

Charge station location and merging module 170 may receive data over transceiver 104 to allow a user to request performing operations such as, for example, locating a charging station appropriate for charging vehicle 130 and accessible given a remaining charge on vehicle 130. In accordance with embodiments, a user may request a charge location and receive a plurality of charge station locations that have been merged to reduce redundancies. In accordance with one or more embodiments, the charging station location and merge module 170 may perform some or all of the location and merge processing either within the vehicle or receive the already processed and merged charge location data over network 140. For example, charge station locator server 120 shown in further detail FIG. 2 includes a charging station location and merge module 270 which may process data and provide such data to a user requesting such data. Depending on system requirements and processing power of vehicle 130, those of skill in the art will appreciate that data processing may be performed in a charge station locator server 120, a remote data processing server, within vehicle 130 or partially within vehicle 130. In one or more embodiments, charge station location and merging module 170 may receive data from a charge station locator server 120 that receives location data from vehicle 130 and returns charge station locations within a predetermined perimeter. In some embodiments, the perimeter is a radius is 150 meters near a location identified by a provider, or within a geohash with an identified location within a perimeter. In other embodiments, the radius may be a function of congestion of electric charging stations, such as in a downtown city area. In such areas, a perimeter identifying smaller area may be more appropriate.

FIG. 2 illustrates some example functional blocks that may be included in charge station locator server 120 in accordance with an embodiment of the disclosure. The functional blocks of charge station locator 120 may include a memory 204, processor 210, location/GPS module 220, transceiver 213, charge station location and merge module 270, database 230, and an operating system (OS) 240. The operating system 240 can be any of various kinds of software used for operating cloud network server 120 such as, for example, a Windows® operating system.

In one or more embodiments, the charge station location and merge module 270 locates a charge station for an electric vehicle driver after collecting data, collating the data and merging redundancies. After merging, a software application such as FordPass™ may be used to display results from merging different charging locations in accordance with embodiments disclosed herein.

In one or more embodiments, charge station location and merge module 270 operates to carry out various actions for displaying available charge stations after merging locations that are combined through merging redundant locations. Charge station location and merge module 270 further removes locations under certain criteria. The processing of data within charge station location and merge module 270, while described with reference to FIG. 2 may be partially performed by charging station location and merge module 170 within vehicle 130 in cooperation with vehicle 130.

The memory 204, which is one example of a non-transitory computer-readable medium, may be used to store the operating system (OS) 240, database 230, and various modules such as the charge station location and merge module 270. One or more modules in the form of computer-executable instructions may be executed by the processor 210 for performing various operations in accordance with the disclosure. More particularly, charge station location and merge module 270 may be executed by the processor 210 to carrying out actions of the charge station location and merge module 270, in one or more embodiments, may be executed for performing methods for merging and reducing redundancies in received raw data, such as batch data received from different providers of charge station locations.

Figure 3:
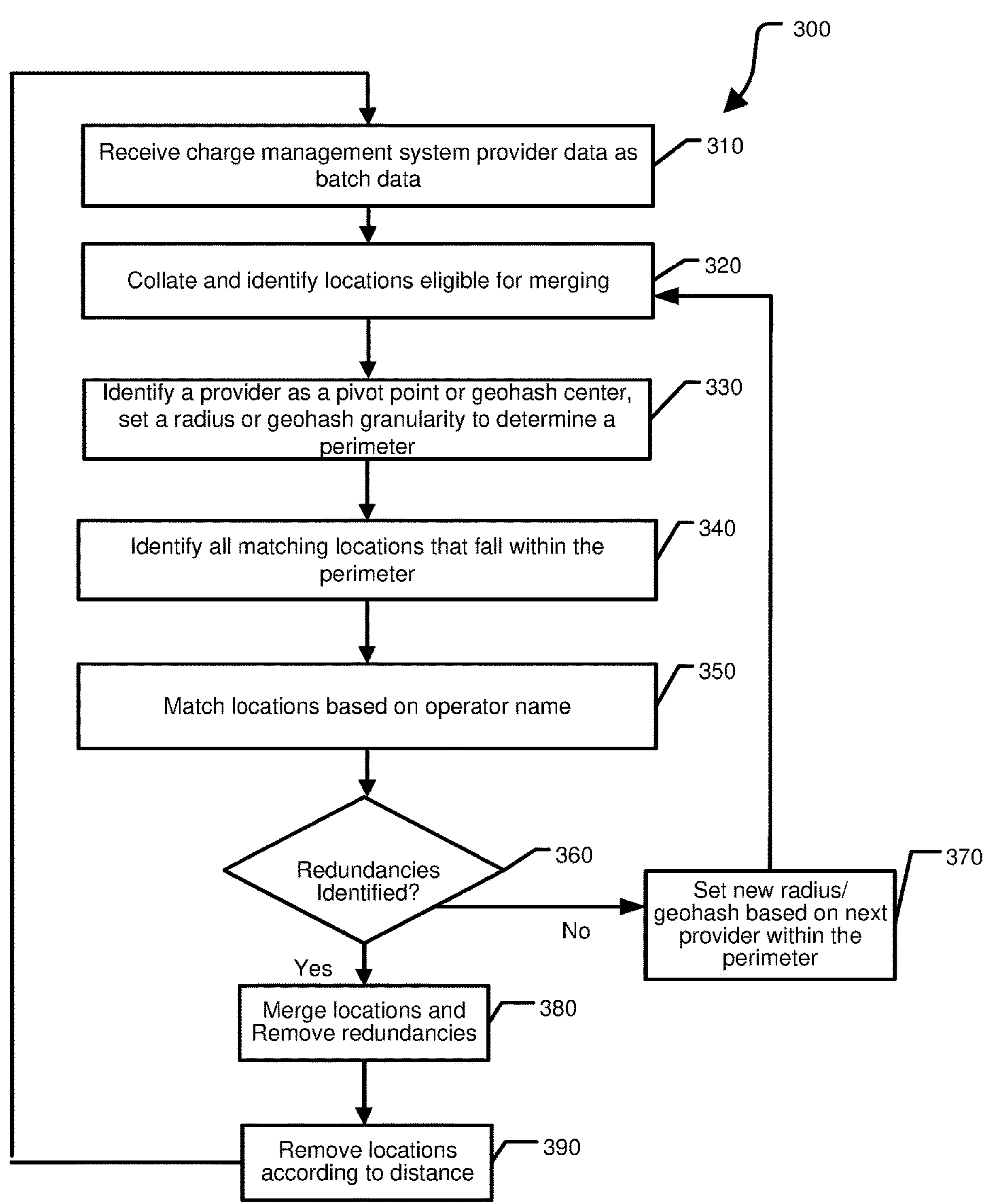
FIG. 3 illustrates a decision flow diagram illustrating a method in accordance with an embodiment of the disclosure.

As shown in FIG. 3 in one or more embodiments, charge station location and merging module 170, at block 310, may retrieve charge station information such as raw batch data from different data providers, such as Charge Management System (CMS) providers. Different CMS providers may provide the same charge station information for the same geographical location resulting in redundant charge station location data.

In some embodiments, the location data relates to GPS data or geohash locations, such as a grid of geohash locations such as provided over GPS or the like. In other embodiments location data is referenced within a circumference defined by a radius such as 150 meters or the like.

As will be appreciated by one of skill in the art, a geohash is a unique identifier of a specific region on the Earth. Earth is divided into regions, or grids, of a defined size and each region is assigned a unique identifier, which is called its geohash. For a given location on earth, the geohash algorithm converts its latitude and longitude into a string. As one of skill in the art will appreciate, the granularity of a geohash location is determined by the number of digits/letters in the hash.

Geohashes have a choice of precision between 1 and 12. The highest-precision geohash of length 12 produces cells that cover less than a square meter of land. The location of where cells are located are predetermined. For example, a 7-digit geohash identifies a location grid that is larger than an 8 digit geohash grid. Charge station location and merge module 170/270 normalizes charge station location data from different CMS providers based on a set of criteria to reduce redundancies. In some embodiments, such data is received daily in a batch data collection retrieval. For example, batch data may be received from providers such as crowd-sourced providers, paid providers, operators and the like.

The batch data may contain duplicate charge station data from different data providers. Block 320 provides for collating and identifying locations eligible for merging. The collating and identifying locations includes applying a set of criteria to the raw data that may be received daily as batch data. The set of criteria includes rules for collating by organizing the locations according to data provider, according to locations, and according to operators that operate charge stations. As will be appreciated by those of skill in the art, some operators have multiple charge stations and some locations may have multiple operators. Thus, collating and organizing raw data prior to merging is a necessary step.

Block 330 provides for identifying a charge station data provider as a pivot point or geohash center, setting a radius or geohash granularity to determine a perimeter. For example, locating a radius of a close distance from the pivot point/geohash center location, such as 150 meters. As one of skill in the art with the benefit of the disclosure with appreciate, a pivot point is a point about which a radius may be determined, such as on a map, by pivoting about a point at a given distance (radius) to set a circumference of a circle. A pivot point as used herein relates to a circumference about a center point (pivot point) to locate charge stations within a perimeter of the identified circle. In other embodiments, a geohash grid with a charge station data provider located within the geohash area identifies the area of concern. More specifically, in some embodiments, a GPS location identifying a location to two decimal places, generally enables locating an area of ¼ mile perimeter. As one of skill in the art will appreciate, a GPS location can be converted into a geohash grid area, and to longitude and latitude coordinates, in accordance with system requirements. The geohash perimeter may be determined first by receiving an address or a GPS location, and identifying the location to two decimal places, which generally enables locating an area of the size of a ¼ mile perimeter. As one of skill in the art will appreciate, a GPS location can be converted into a geohash grid area, and to longitude and latitude coordinates, in accordance with system requirements.

A GPS area may include a circumference area which may serve to identify a pivot point center, which may be more appropriate for some embodiments.

In some embodiments, the perimeter size of the geohash grid may be a function of the congestion of an area or congestion of charge stations or the like. Thus, in a congested area, a radius of 30 meters is more appropriate. Block 340 provides for identifying locations that fall within a perimeter. It may be a perimeter defined by a geohash grid, or it may be the circumference of the circle defined by the radius. If geohashing is being used to define a perimeter, the size of the geohash in numbers of digits may be increased to accommodate the congestion of the area.

Block 350 provides for matching locations based on an operator's name. More specifically, if a same operator has a location at or near a second location with a same operator, criteria may indicate combining locations. As will be appreciated, many operators have multiple locations and at times, near a same location. Matching locations based on an operator's name combines locations that list a same operator within a given perimeter. The locations will not be the same, but will be within the given perimeter. If, however, a location is within a meter of another location, criteria will indicate that the locations should be combined as more than likely redundant.

Decision block 360 asks if redundancies have been identified. If not, block 370 provides for setting a new radius based on a next provider within the circumference or new geohash grid and returning to block 320. For example, if all redundancies are accounted for, block 370 loops back to block 320 to collate and identify locations eligible for merging until all providers are accounted for.

If the decision is yes, block 380 provides for merging locations and removing any redundancies. For example, if criteria, set to merge all locations within a given distance with a same operator, they can be merged. The distance is determined according to the size of the area under consideration and whether the locations are associated with a same operator. Block 390 provides for removing locations according to distance. In one embodiment, all locations with a same operator within the perimeter of an area under consideration may be merged. In another embodiment, all locations with a same operator within a perimeter are merged except for edge cases. For example, if there are edge cases that can be part of a different circumference/perimeter or geohash grid area, criteria may dictate removing the location as not helpful for users trying to locate charge stations closer to the center of the perimeter.

In one embodiment, a perimeter is set that is determined according to the location of a data provider. More particularly, as shown in FIG. 1, charge management system (CMS) providers and aggregators 180 may provide inconsistent information including redundant information or locations that are inaccurate. For example, if a crowd-sourced location is provided based on where the crowd-sourced provider is located, such as a driver of a vehicle simply designating a current location close to an operator, such data is not as accurate as data from the actual operator. Other CMS providers may be more accurate, such as fleet-based CMS providers that include actual location data, cost data and efficiency data concerning a charging station. Tables A, B, C and D below illustrate a merge logic that takes into account the different CMS data, both crowd sourced and other data provider-based information and combines the data, which may be batch data, and reduces redundancies based on perimeters or circumferences about different data provider locations, depending on whether a radius about a provider is considered or a geohash grid.

As shown in Table A, below, charge station data providers such as charge station data provider locations are identified within a perimeter, and raw data provides matching locations and operator names. Thus, for example, if a same location has different operators, the locations would not be combined. As will be appreciated by one of skill in the art, a perimeter applies to both geohash grid areas which may be square and to circumferences defined by a radius.

After a data provider is identified, and a perimeter is determined around it, within the perimeter the method identifies all the matching locations from other data providers (Ex: Data provider B locations B1, B2, B3 . . . Bn) that fall within the perimeter—either a geohash grid or a circumference defined by a radius or GPS identifier. Locations within the perimeter get further compared and matched based on the operator's name.

All matching locations per operator may be identified for all the locations from data provider A. (Locations ranging from—A1, A2, A3, . . . An). As shown in Table A, matching location data is shown:

TABLE A

| Provider A - Locations | Matching Location | Operator Name |
|---|---|---|
| $A_1$ | $\{B_1, B_2\}$ | X |
| $A_2$ | $\{B_3, B_4, B_5\}$ | Y |
| $A_3$ | $\{B_1, B_2, B_4\}$ | Z |

After matching locations for data provider A and identifying operator names is completed for provider A, as shown in FIG. 3, the same procedure is repeated for data provider B within the same original perimeter. Then, each location from provider B becomes a center of a geohash grid or, if a radius is used, a pivot point. For example, block 370 in FIG. 3 sets a new radius or center of a geohash based on a next data provider (provider B). Below is a sample representation, Table B of matching location data.

TABLE B

| Provider B - Locations | Matching Location | Operator Name |
|---|---|---|
| $B_1$ | $\{A_1, A_3\}$ | X |
| $B_2$ | $\{A_1, A_3\}$ | Y |
| $B_3$ | $\{A_2\}$ | Z |

After populating all the matching locations for data providers A and B, the closest matching locations for data provider B locations are merged and farther locations may be removed as shown in Table C.

TABLE C

| Provider B - Locations | Matching Location | Operator Name |
|---|---|---|
| $B_1$ | $\{A_1\}$ | X |
| $B_2$ | $\{A_3\}$ | Y |
| $B_3$ | $\{A_2\}$ | Z |

Next, the matching locations for data provider A are merged and the closest locations retained as shown in Table D:

TABLE D

| Provider A Locations | Matching Location | Operator Name |
|---|---|---|
| $A_1$ | $\{B_1\}$ | X |
| $A_2$ | $\{B_3, B_4, B_5\}$ | Y |
| $A_3$ | $\{B_2, B_4\}$ | Z |

Based on Table C, location data for data provider A and Table D, merging logic merges location data for Provider B.

Figure 4:
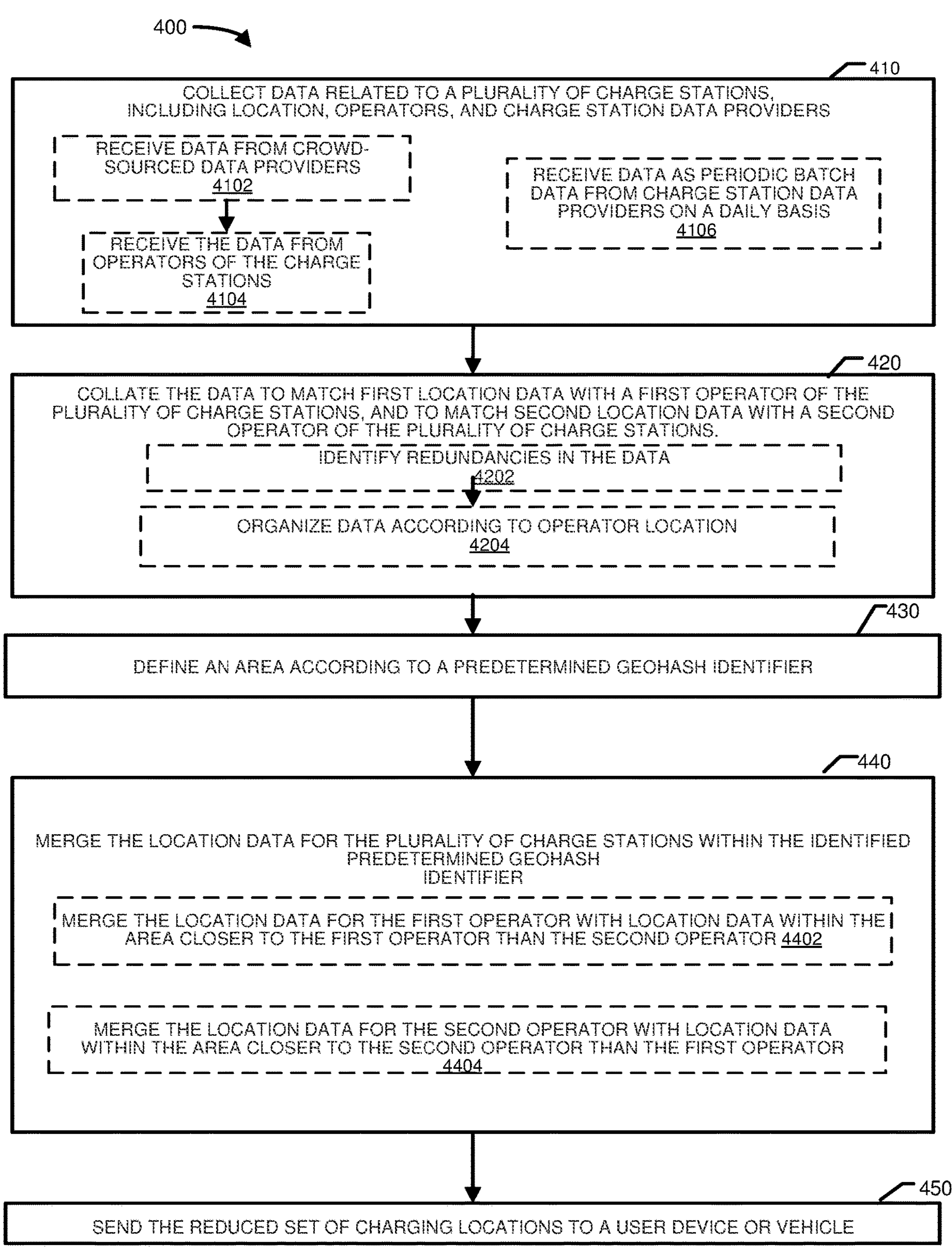
FIG. 4 illustrates an exemplary flow diagram of a method in accordance with an embodiment of the disclosure.

Referring now to FIG. 4, a flow diagram 400 illustrates a method in accordance with an embodiment. Block 410 provides for collecting raw data related to electric charging stations, the raw data identifying location data of a plurality of charge stations, an operator of each of the plurality of charge stations, and a data provider for each of the plurality of charge stations. For example, collecting raw data may be from a data provider that identifies a plurality of charge stations from different operators. In one or more embodiments, the collecting raw data may include receiving raw data from crowd-sourced data providers. For example, as shown in optional block 4102, crowd-sourced data providers may collect data from different users in real time and provide raw data as batch data to different sources. Raw data may also be made available from operators of charge stations as periodic batch data, as shown in optional block 4104. Some raw data may be collected and sent periodically as batch data on a daily basis, as shown in optional block 4106.

Block 420 provides for collating the raw data to match first location data with a first operator of the plurality of charge stations, and to match the second location data with a second operator of the plurality of charge stations. Within block 420 is optional block 4202 which provides for identifying redundancies in the data, and optional block 4204 which provides for organizing data according to operator location. For example, the data may have redundancies because raw data and crowd sourced data may include the same data. Further organizing data according to operator location enables a sorting of data within different geographical locations.

In one or more embodiments, the collating the raw data includes collecting the raw data as batch data. The raw data may be derived from crowd sourcing, commercial sources and from operators and the like. Given the different sources, conflicting and duplicative data may be identified during collation of the data. Thus, in some embodiments, the collating may include identifying and removing redundancies in the raw data and organizing the raw data according to operator location. Thus, as used herein, data provider refers to any provider of data and locations identified by any particular data provider may or may not be accurate. Operators, on the other hand, are confirmed charge station operators and their locations may be known and may be used as a center for determining a perimeter thereabout. In some embodiments, a perimeter about a known location of a confirmed charge station operator is beneficial to weed out redundancies presented by inaccurate crowd sourced data, or subscription based data and the like. In other embodiments, the confirmed charge station operator location is unknown, each data provider, whether confirmed as accurate or not, may be considered as a center location, with alternate perimeters considered to enable a statistical likelihood that redundancies may be reduced by repeating the process in a statistical analysis converging onto a more likely than not identification of true locations of charging stations within an area under consideration.

Block 430 provides for defining an area according to a predetermined geohash identifier. For example, in one embodiment, the geohash identifier for an area may cover several operators in the area or just a single operator. Defining an area according to a geohash identifier limits the data to be considered to the geographical area defined by the geohash identifier. As described above, a geohash identifier has a precision determined by the length of the identifier. Thus defining the area includes determining the precision and size of the area under consideration. In one embodiment, an area may include defining operator 610 as a center of a geohash grid that is located by converting a GPS location to a geohash identifier at a predetermined precision.

In some embodiments, setting the predetermined geohash identifier is a function of charge station congestion such that dispersed charge station location areas have a larger geohash than congested metropolis location areas. For example, a larger radius or geohash (smaller identifier) would result in a larger perimeter for both embodiments. A typical urban area in the United States may require a radius of 150 meters to provide a reasonable circumference for charge stations. In contrast, a typical urban area in Germany however, being a congested area with many charging stations may benefit from a configurable radius of 30 meters or a geohash area with more precision.

Thus, in one embodiment, a geohash in Germany may require eight digits of granularity due to congestion and a United States urban area may only require seven digits of granularity due to the lack of congestion and the need for a larger area to compare.

Figure 6A:
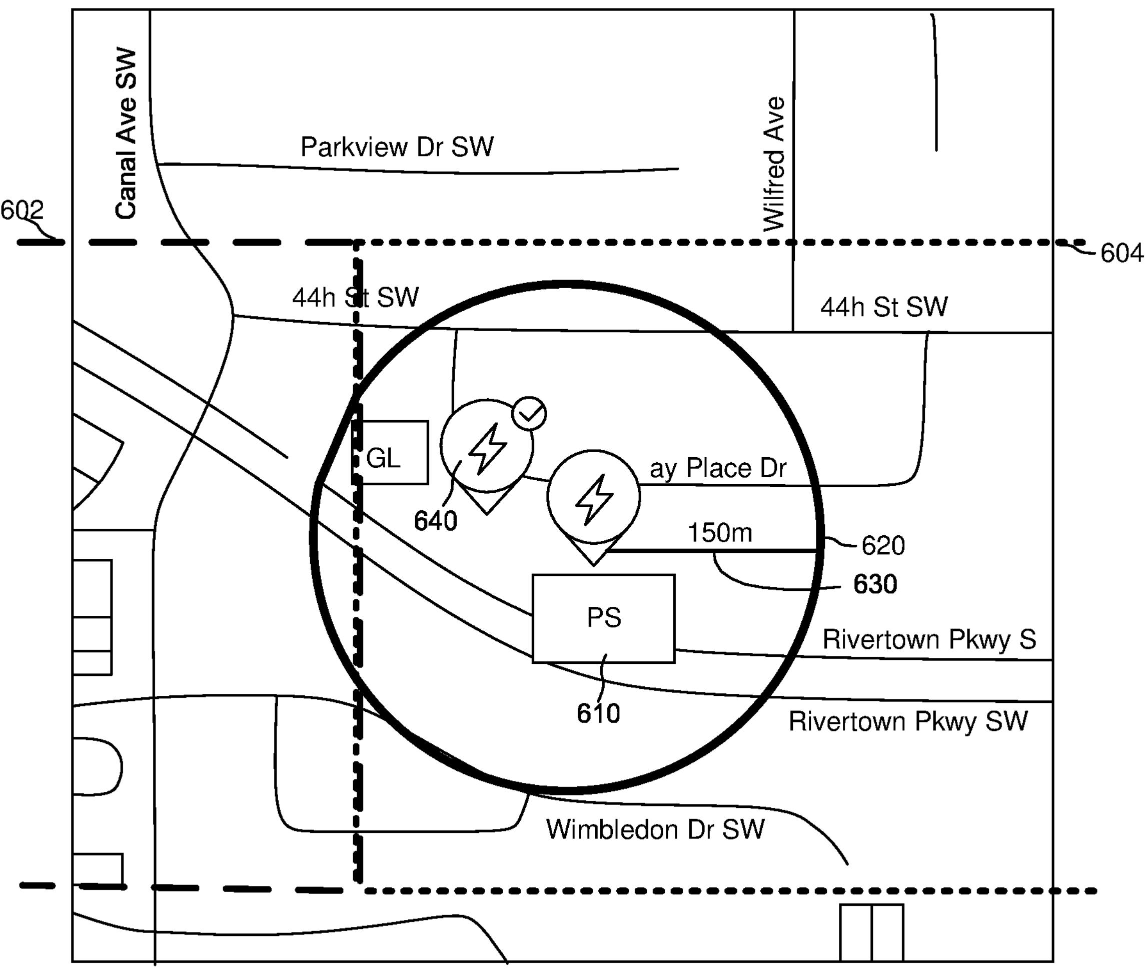
FIG. 6A illustrated an example map for sequential merging in accordance with an embodiment of the disclosure.
Figure 6B:
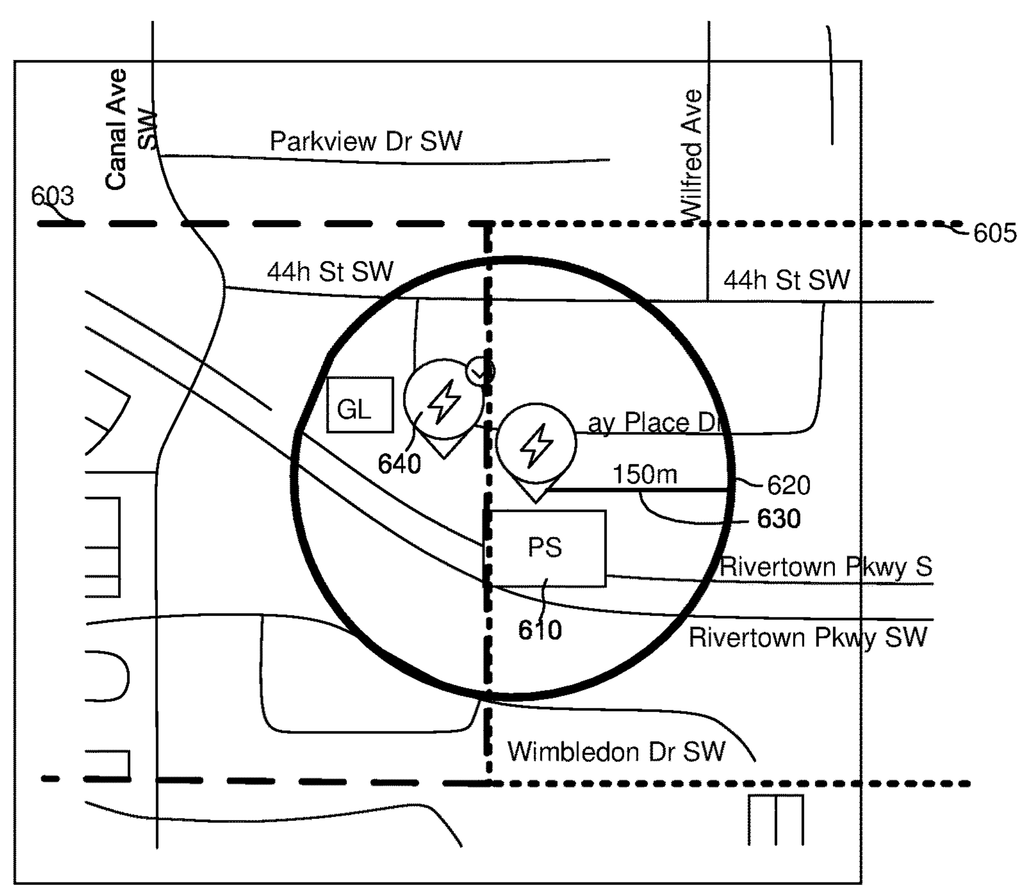
FIG. 6B illustrates an example map for an alternate geohash solution in accordance with an embodiment of the disclosure.

Block 440 provides for merging the location data for the plurality of charge stations within the identified predetermined geohash identifier. For example, as shown in FIGS. 6A and 6B, different geohash areas are illustrated. In FIG. 6A, if charging location data 640 and 610 are in the same geohash area they may be merged if there is one known operator in the area. Referring to FIG. 6B, if two different geohash areas split the location data, then according to one embodiment, the location data would not be merged. Rather, the location data would be associated with different charging stations. Thus, depending on the different system requirements, embodiments may benefit from either a geohash solution or a radius solution. For example, if energy efficiency and processing time is of concern, a geohash perimeter may be preferred due to the increased processing requirements of radius determinations identifying a circumference.

Within block 440 is block 4402 and block 4404. Block 4402 provides for merging the location data for the first the operator with location data within an area closer to the first operator than the second operator. Block 4404 provides for merging the location data for the second operator with location data within an area closer to the second operator than the first operator. Thus, merging the location data for the plurality of charge stations within a given geohash area includes identifying the location data associated with a first operator as location data closer to the first operator than a second operator. Thus, if a geohash area has two operators known in the area, any location data within the area can be designated according vicinity of an operator. If several operators are identified within a geohash area, location data can be similarly merged with location data closest to the operators.

Next, block 450 provides for sending the reduced set of charging locations to a user device or vehicle. For example, a user device may be a mobile device or a computer. The reduced set of charging locations enables a user or a driver to locate a charge station without requiring additional steps to sift through possible locations.

Figure 5:
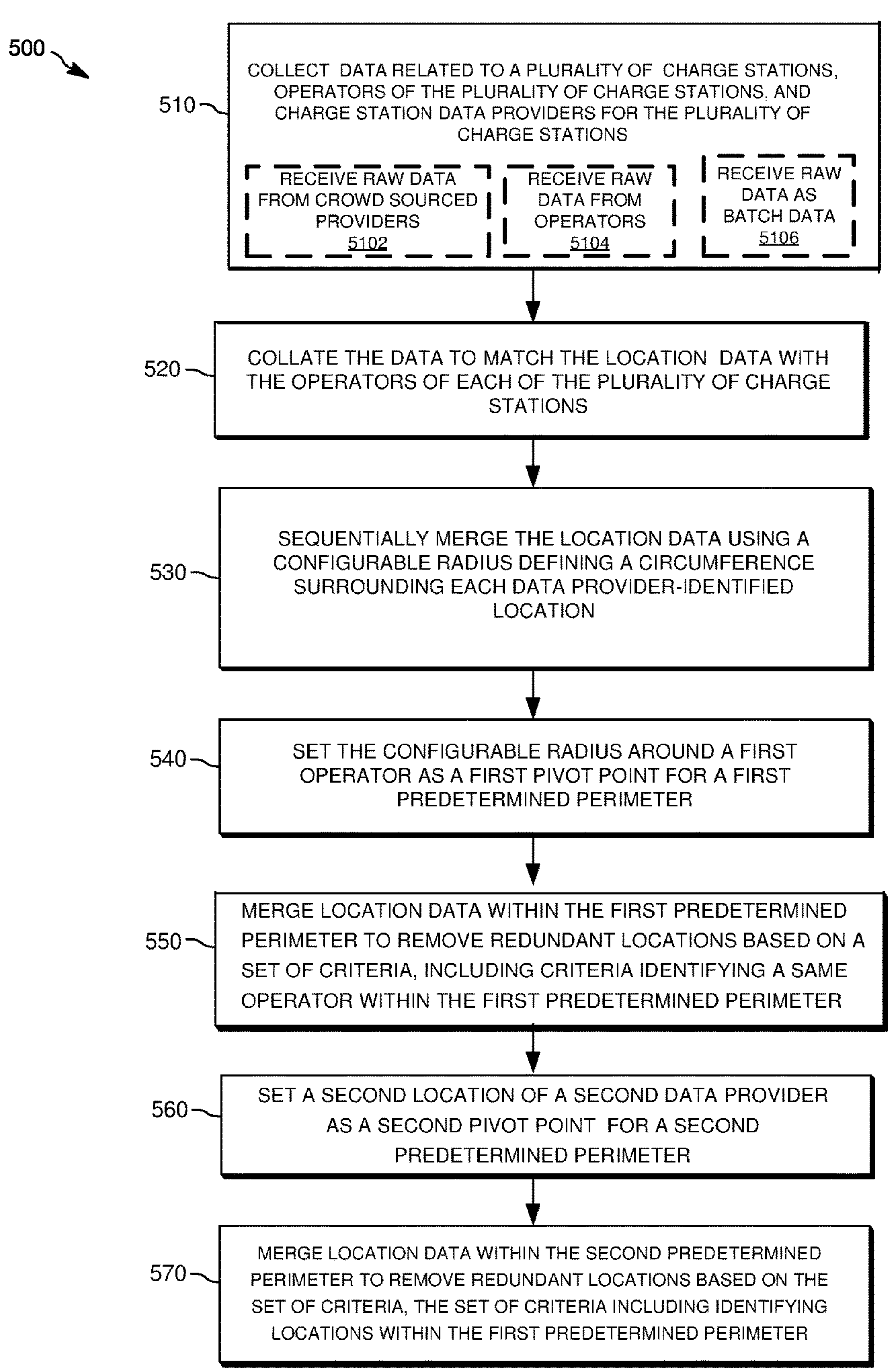
FIG. 5 illustrates an exemplary flow diagram of another method in accordance with an embodiment of the disclosure.

Referring now to FIG. 5, a flow diagram illustrating a method according to another embodiment is directed to a solution including determining a radius about a pivot point rather than a geohash area. Block 510 provides for collecting raw data related to electric charging stations, the raw data identifying location data of a plurality of charge stations, an operator or each of the plurality of charge stations and a data source for each of the plurality of charge stations. Block 5102, 5104 and 5106 provide for receiving raw data from crowd sourced providers, from operators, and as batch data. The data may include a large area as a function of the data providers and the availability of data and system requirements. Block 520 provides for collating the data to match the location data with the operators of each of the plurality of charge stations. For example, the collating can include reducing redundancies by matching the same data and deleting redundancies, as described above.

Block 530 provides for sequentially merging the location data based using a configurable radius defining a circumference surrounding each data provider-identified location. The sequential merging, meaning merging sequentially by considering each potential charging location individually, may be based on a set of criteria, which is further described with reference to FIGS. 6A, 6B, and 7. As shown, a map illustrates a confirmed operator 610 as a center of a circumference 620 using a configurable radius 630 of 150 meters. The data also provides a location of an operator at location 640 within the circumference. In a 150-meter radius embodiment, both operator locations 610 and 640 may be combined due to the proximity of the locations.

Block 540 provides for setting the configurable radius around a first operator as a first pivot point for a first predetermined perimeter. As shown in FIG. 6A, operator 610 is used as a pivot point or center. The radius shown in FIGS. 6A and 6B is 150 meters but may be altered in accordance with system requirements or in accordance with criteria associated with the number charging stations in an area under consideration.

Block 550 provides for merging location data within the first predetermined perimeter to remove redundant locations based on a set of criteria, including criteria identifying a same operator within the first predetermined perimeter. For example, the data associated with operator 640 in FIG. 6A is merged with the data related to operator 610 to more accurately reflect the location of a charge station. Because the operator's actual location may be known, the data provider location may be determined to be incorrect as to the area within the perimeter. The result is the same for a geohash solution if the geohash grid does not separate the two charge station data providers among different predetermined geohash grids, as shown in FIG. 6A as compared to FIG. 6B.

Block 560 provides for setting a second location of a second data provider as a second pivot point for a second predetermined perimeter. For example, referring to FIG. 7, two pivot points are illustrated, one centered at 702 and one centered at 704. The additional pivot point may serve to address edge cases in which a charge station location may be near an edge of one circumference but be closer to second pivot point.

Figure 7:
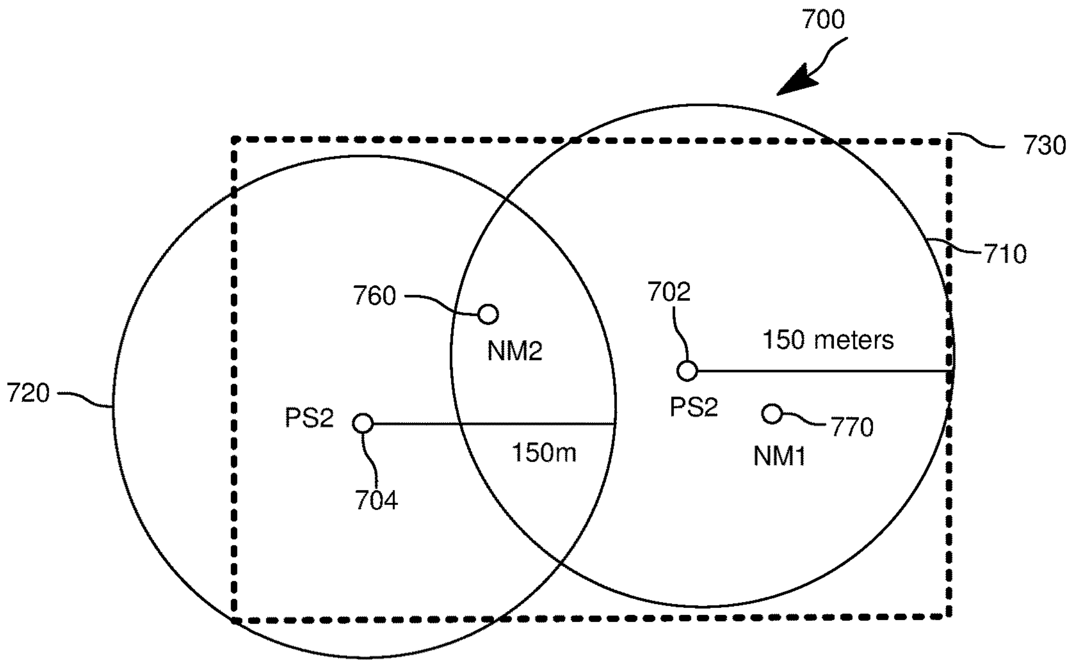
FIG. 7 illustrates an example schematic diagram of operator locations being assigned to data providers in accordance with an embodiment of the disclosure.

Block 570 provides for merging location data within the second predetermined perimeter to remove redundant locations based on the set of criteria, the set of criteria including identifying locations within the first predetermined perimeter. For example, as shown in FIG. 7, if only one pivot point 702, were present, then location data for 760 and 770 would be associated with operator 702. With second pivot point 704, data for 760 is merged with operator 704, and data associated with 770 is merged with operator 702, depending on the distance between 704 and 760 as compared to the distance between 760 and 702. Thus merging location data within second predetermined perimeter, 720, to remove redundant locations, such as location 760, based on distance criteria, and identifying locations 760 and 770 that are within the first perimeter 710.

After merging the charging station location data and removing redundancies, in one or more embodiments, the data is sent to a user device, such as user device 155 or sent to vehicle 130, such as to charging station location and merge module 170 for display within vehicle 130.

According an embodiment using pivot points, the operator locations 650 and 660 are assigned as merged to different operators according to distance criteria. Thus, NM1 660 is assigned to the first operator 602 because the distance criteria is set to include NM1 660 and NM2 650 is assigned to the second operator 604. The data is then merged accordingly. For example, the data for NM1 660 is merged with operator 602 information, and the data for NM2 650 is merged with second operator 604 information.

Referring to FIG. 7, map 700 illustrates that first data provider 702, a second data provider 704, a first circumference 710 and a second circumference 720. In one embodiment, the circumferences are both with 150-meter radii as to each data provider. Charge station operators are shown as NM1, NM2 and PS1, PS2 operators which may or may not be located in a same geographical area. As described above, in some embodiments, a geohash perimeter is used to merge data associated with different locations, and in other embodiments, a radius of 150 meters as shown around operator 704 and 702. For a geohash of 730 area, all operators are combined into one operator identified as closest to a center of geohash 730. In a circumference embodiment, data may be combined into operator 702 or operator 704, depending on the distance from each operator when used as a pivot point.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments, as will be understood by those of ordinary skill in the art with the benefit of the present disclosure.

That which is claimed is:

1. A method for electric vehicle charge station management comprising:

receiving, via a transceiver, data related to a plurality of charge stations, the data including location data for the plurality of charge stations, operators of the plurality of charge stations, and charge station data providers for the plurality of charge stations;

storing the data in memory;

collating, by at least one processor accessing the memory, the data to match the location data with the operators of the plurality of charge stations;

sequentially merging, by the at least one processor, the charge stations identified using a configurable radius defining a circumference surrounding each data provider-identified location to determine a reduced set of charging locations; and sending, via the transceiver, the reduced set of charging locations to a user device or vehicle.

2. The method of claim 1 wherein collecting the data further comprises:

receiving the data from crowd-sourced data providers; and receiving the data from the operators of the plurality of charge stations.

3. The method of claim 1 wherein collecting the data further comprises:

receiving the data as periodic batch data from charge station data providers on a daily basis.

4. The method of claim 1 wherein collating the data further comprises:

identifying redundancies in the data; and organizing the data according to operator location.

5. The method of claim 1 wherein sequentially merging the charge stations identified further comprises:

setting the configurable radius about a first operator as a first pivot point for a first predetermined perimeter; and merging location data within the first predetermined perimeter to remove redundant locations by identifying a same operator within the first predetermined perimeter.

6. The method of claim 5 further comprising:

setting a second location of a second source provider as a second pivot point for a second predetermined perimeter; and merging the location data within the second predetermined perimeter to remove redundant locations including identifying locations within the first predetermined perimeter.

7. The method of claim 6 further comprising:

revising matching locations for first data provider based on the second predetermined perimeter; and removing locations identified by the first data provider within the second predetermined perimeter based on distance.

8. The method of claim 1 wherein sequentially merging the charge stations identified further comprises:

setting the configurable radius as a function of charge station congestion such that dispersed charge station location areas have a larger radius than congested metropolis location areas.

9. The method of claim 8 wherein the configurable radius in dispersed charge location areas is at least 150 meters.

10. The method of claim 8 wherein the configurable radius in metropolis charge location areas is at least 30 meters.

11. A system comprising:

a memory that stores computer-executable instructions;

a transceiver coupled to memory, the transceiver configured to receive data related to a plurality of charge stations, the data including location data of the plurality of charge stations, operators of each of the plurality of charge stations, and charge station data providers for each of the plurality of charge stations;

a processor configured to access the memory and execute the computer-executable instructions to:

collate the data to match the location data with the operators of each of the plurality of charge stations; and sequentially merge the charge stations identified using a configurable radius defining a first circumference surrounding each charge station data provider-identified location to determine a reduced set of charging locations; and send the reduced set of charging locations to a user device or vehicle.

12. The system of claim 11 wherein the transceiver configured to receive data related to the plurality of charge stations, the data including location data of the plurality of charge stations, operators of each of the plurality of charge stations, and charge station data providers for each of the plurality of charge stations is further configured to:

receive the data from crowd-sourced data providers; and receive the data from the operators of the plurality of charge stations.

13. The system of claim 11 wherein the processor configured to access the memory and execute the computer-executable instructions to collate the data to match the location data with the operators of each of the plurality of charge stations further comprises computer-executable instructions to:

identify redundancies in the data; and organize the data according to operator location.

14. The system of claim 11 wherein the processor configured to access the memory and execute the computer-executable instructions to sequentially merge the charge stations identified using the configurable radius defining the circumference surrounding each charge station data provider-identified location to determine the reduced set of charging locations further comprises computer-executable instructions to:

set the configurable radius about a first data provider as a first pivot point for a first perimeter; and merge location data within the first perimeter to remove redundant locations, including identifying a same operator within the first perimeter.

15. The system of claim 14 further comprises computer-executable instructions to:

set a second location of a second source provider as a second pivot point for a second perimeter;

merge location data within the second perimeter to remove redundant locations based on a set of criteria, the set of criteria including locations identified within the first perimeter;

update matching locations for first data provider based on the second perimeter; and remove locations identified by the first data provider within the second perimeter based on distance.

16. The system of claim 11 wherein the processor configured to access the memory and execute the computer-executable instructions to sequentially merge the charge stations identified using the configurable radius defining the circumference surrounding each charge station data provider-identified location to determine the reduced set of charging locations further comprises computer-executable instructions to:

set the configurable radius as a function of charge station congestion such that dispersed charge station location areas have a larger radius than metropolis location areas.

17. The system of claim 16 wherein the configurable radius in dispersed charge location areas is at least 150 meters.

18. The system of claim 16 wherein the configurable radius in metropolis charge location areas is at least 30 meters.

19. An electric vehicle comprising:

a plurality of batteries;

a vehicle computer coupled to the battery, the vehicle computer configured with:

a memory that stores computer-executable instructions;

a transceiver coupled to memory, the transceiver configured to receive data related to a plurality of charge stations, the data including location data of the plurality of charge stations, operators of each of the plurality of charge stations, and charge station data providers for each of the plurality of charge stations;

a processor configured to access the memory and execute the computer-executable instructions to:

collate the data to match the location data with the operators of each of the plurality of charge stations;

sequentially merge the charge stations identified using a configurable radius defining a circumference surrounding each charge station data provider-identified location to determine a reduced set of charging locations; and send the reduced set of charging locations to a user device or vehicle.

20. The electric vehicle of claim 19 wherein the processor configured to access the memory and execute the computer-executable instructions to sequentially merge the charge stations identified using the configurable radius defining the circumference surrounding each charge station data provider-identified location to determine the reduced set of charging locations further comprises computer-executable instructions to:

set the configurable radius about a first data provider as a first pivot point for a first perimeter;

merge location data within a first perimeter to remove redundant locations based on the set of criteria, including criteria identifying a same operator within the first perimeter;

set a second location of a second source provider as a second pivot point for a second perimeter;

merge location data within a second perimeter to remove redundant locations including locations identified within the first perimeter;

revise matching locations for first data provider based on the second perimeter; and remove locations identified by the first data provider within the second perimeter based on distance.

* * * * *